A. W. JONES.
FAN BELT PULLEY FOR INTERNAL COMBUSTION MOTORS.
APPLICATION FILED SEPT. 6, 1921.

1,424,413.

Patented Aug. 1, 1922.

INVENTOR.
Albert W. Jones
BY
U. G. Charles
ATTORNEY.

UNITED STATES PATENT OFFICE.

ALBERT W. JONES, OF WICHITA, KANSAS.

FAN-BELT PULLEY FOR INTERNAL-COMBUSTION MOTORS.

1,424,413.  Specification of Letters Patent.  Patented Aug. 1, 1922.

Application filed September 6, 1921. Serial No. 498,629.

*To all whom it may concern:*

Be it known that I, ALBERT W. JONES, a citizen of the United States, and resident of Wichita, in the county of Sedgwick and State of Kansas, have invented certain new and useful Improvements in Fan-Belt Pulleys for Internal-Combustion Motors, of which the following is a specification.

My invention relates to fan belt pulleys for internal combustion motors, and the objects of the invention are, (a) to provide fan belt pulleys for Ford auto motors that shall hold the fan belt away from the conducting wires of the "timer"; and (b) to provide, for use on any make of I. C. motor, pulleys or pulley attachments adapted for round belts; as I have reason to believe that round belts (that is round in section) are longer-lived for the purpose indicated, than are the flat belts now employed.

In the Ford car, the fan belt is carried so close to the wires leading to or from the "timer" that the fan belt often frays the insulation and finally cuts the said wires, or one of them, in two.

With the above-named objects in view, I propose to manufacture split pulley-faces, of special designs, adapted for quick attachment to the regular fan-belt pulleys, and designed to carry a belt of round section, with the belt groove so located that the belt shall be carried nearly an inch farther away from the said wires than is the regular fan belt in Ford motors.

In the accompanying drawings I have illustrated two forms of my improved pulleys, designed for use on either flanged or unflanged pulleys respectively.

Figure 1:
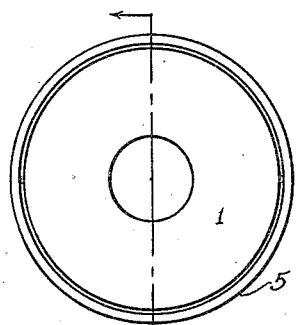
Figure 3:
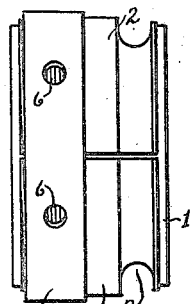
Figure 2:
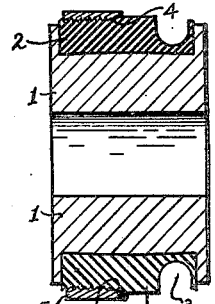
Figure 4:
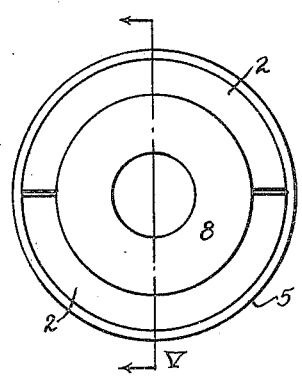
Figure 6:
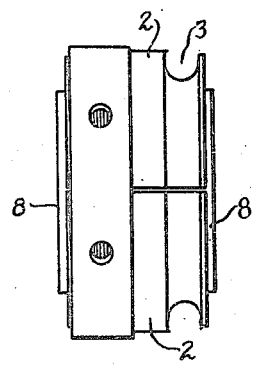
Figure 5:
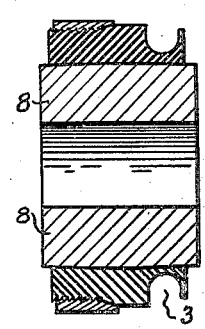
Figure 7:
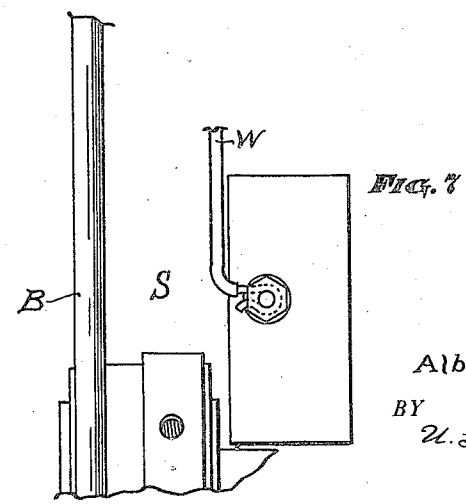

Figures 1, 2 and 3 show the flanged combination, and Figs. 4, 5 and 6 show the unflanged combination. Fig. 1 is an end elevation of a flanged pulley with my attachment; Fig. 2, a section on line II of Fig. 1; Fig. 3, a side elevation; Fig. 4 an end elevation of an unflanged pulley with my attachment; Fig. 5, a section on line V of Fig. 4; and Fig. 6, a side elevation of Fig. 4. Fig. 7 is a diagram showing the extent of the space which I thus obtain between the fan belt and the wires.

On Figs. 1, 2 and 3, numeral 1 denotes the two-flanged pulley of either a fan shaft or its countershaft. My improvement consists of an annular, split pulley 2, having its bore shaped to fit the face of the regular pulley 1, and having a belt-groove 3 at one end thereof. The halves 2 are formed with a short taper 4, and the reduced end threaded, to receive an internally threaded clamp-ring 5. The entering end of this ring is internally tapered to fit the taper on the parts 2. Hence, by turning the ring 5 home tightly (using a spanner in holes 6) the halves 2 may be drawn very tightly upon the pulley 1.

Some fan belt pulleys in Ford motors are unflanged; such a pulley, marked 8, is shown on Figs. 4 and 5. The construction of my attachment is unaffected, and the parts will be as permanently secured in place to plain pulleys as to flanged.

Fig. 7 shows the result of equipping a Ford motor with my improvement—there being created a wide space S between the belt B and the wires W, which wires are now being destroyed by too-closely running fan belts.

Having thus described my invention, I claim and desire to secure by Letters Patent:

1. The combination, with a regular pulley, of a split, annular pulley provided with an external thread and with a groove for a round belt; and an internally threaded clamp-ring embracing the threaded periphery of said split pulley.

2. In combination, a split, annular belt-pulley formed with a reduced threaded portion and with a taper between the latter and the larger diameter; and an internally threaded clamp-ring formed with an internal taper fitted to the taper on the pulley, the threads of said ring fitting the threads on said pulley.

ALBERT W. JONES.

Witnesses:
M. Y. CHARLES,
W. A. NETHENOT.